(12) United States Patent
Jiang

(10) Patent No.: US 8,715,551 B2
(45) Date of Patent: May 6, 2014

(54) PLASTIC PRODUCT WITH THREE DIMENSIONAL PATTERN AND MANUFACTURING METHOD OF THE SAME

(75) Inventor: Peng-Jun Jiang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 18 days.

(21) Appl. No.: 13/241,177

(22) Filed: Sep. 22, 2011

(65) Prior Publication Data

US 2013/0029104 A1    Jan. 31, 2013

(30) Foreign Application Priority Data

Jul. 25, 2011  (CN) .......................... 2011 1 0208764

(51) Int. Cl.
*B29C 45/14* (2006.01)

(52) U.S. Cl.
USPC ........... 264/132; 264/135; 264/263; 264/275; 264/266

(58) Field of Classification Search
None
See application file for complete search history.

(56) References Cited

U.S. PATENT DOCUMENTS 6,701,652 B1 *   3/2004   McElhatton et al. ........... 40/615
2011/0117326 A1 *  5/2011  Chiu et al. .................... 428/172

FOREIGN PATENT DOCUMENTS

GB       2010169        *  6/1979
WO    WO 2011/108483    *  9/2011

* cited by examiner

*Primary Examiner* — Edmund H. Lee
(74) *Attorney, Agent, or Firm* — Novak Druce Connolly Bove + Quigg LLP

(57) ABSTRACT

A plastic product having patterns in three dimensions includes an injecting base and a first film adhered to one side of the base. The first film includes a first pattern away from the base and a thickening layer attached to the first pattern. The first pattern is positioned between the thickening layer and the first film. A first raised portion is formed on the first film and inserted into the base.

7 Claims, 8 Drawing Sheets

PLASTIC PRODUCT WITH THREE DIMENSIONAL PATTERN AND MANUFACTURING METHOD OF THE SAME

BACKGROUND

1. Technical Field

The disclosure relates to a plastic product with three dimensional patterns and a manufacturing method of the plastic product.

2. Description of Related Art

Plastic products are widely used. Some plastic products have decorative patterns thereon for artistry and beauty. Commonly, an In-Mold-Decoration (IMD) technology is developed to provide three dimensional patterns on the plastic products. The IMD technology incorporates a foil on which decorative patterns are printed. The foil is placed in a cavity bounded by molds. The cavity provides a relief pattern area on an inner surface. The decorative patterns adhere to the plastic product after the plastic product is molded and separated from the cavity, thus forming the three dimensional patterns on the plastic product. However, the three dimensional patterns are formed on an outer surface of the plastic product, and are easily worn away over time.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
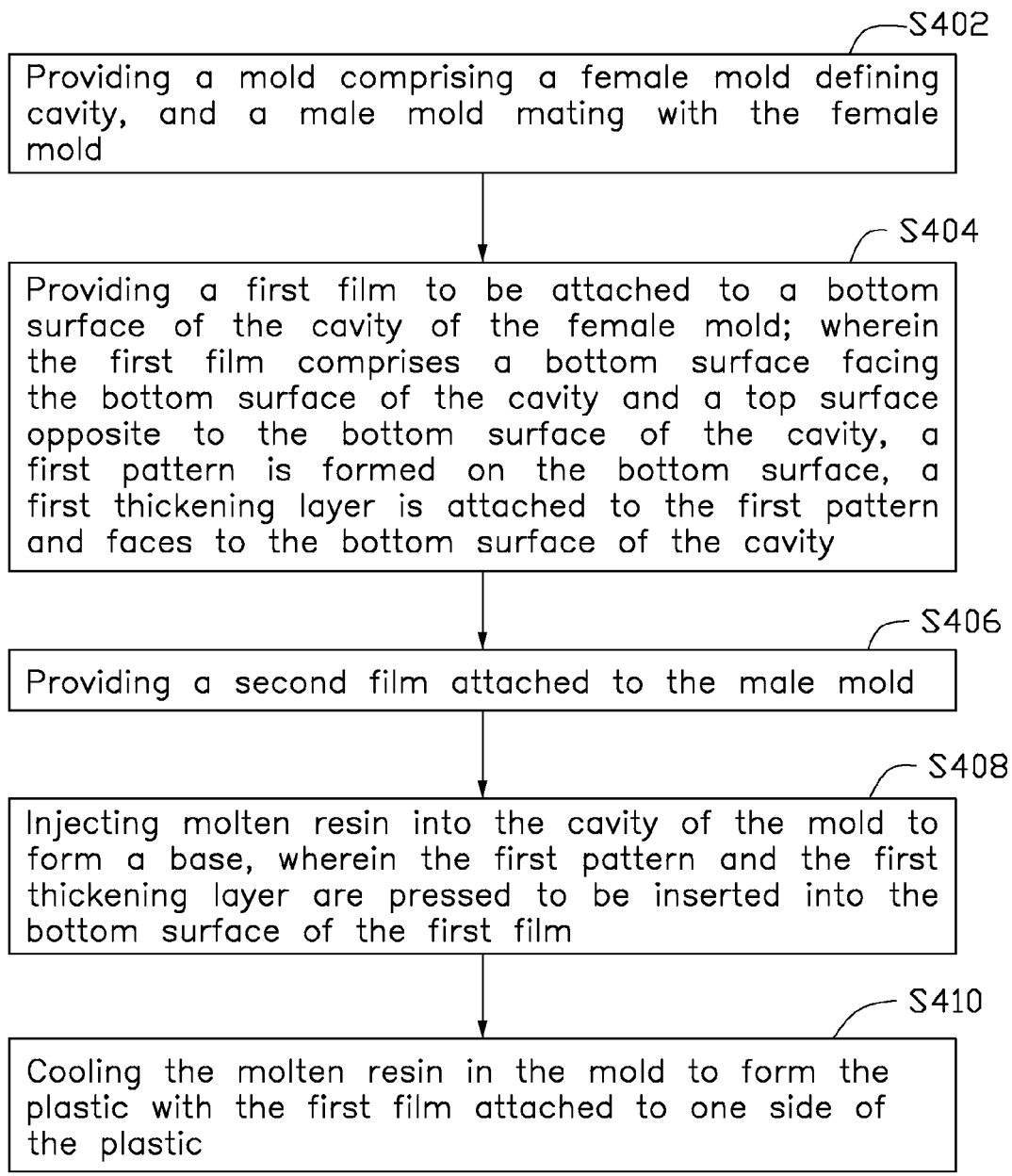
FIG. 1 is a flowchart of a method for manufacturing plastic products having three dimensional patterns in accordance with a first exemplary embodiment of the present disclosure.
Figure 2:
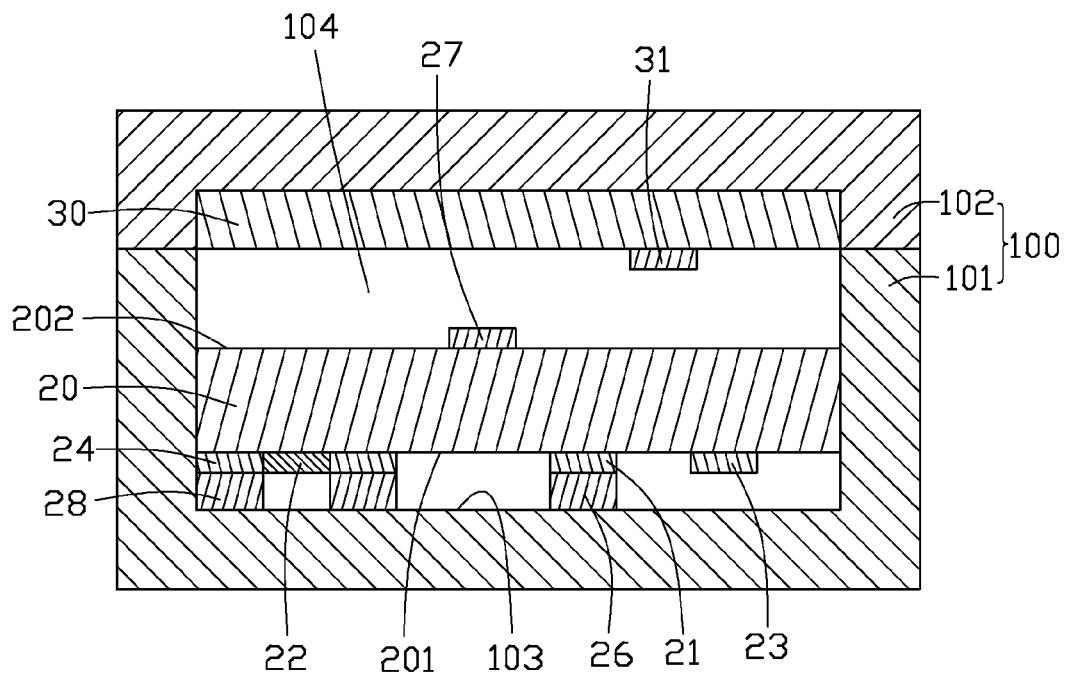
FIG. 2 is a cross-sectional view of an apparatus for manufacturing plastic products utilizing the method of the first exemplary embodiment of FIG. 1, before injecting resin.

Referring to FIG. 1 and FIG. 2, a method for manufacturing plastic products having three dimensional patterns in accordance with a first embodiment of the present disclosure includes the following steps.

Step S402, a mold 100 is provided to mold the plastic product, the mold 100 includes a female mold 101 and a male mold 102 mating with the female mold 101.

Step S404, a first film 20 is provided to be attached to a bottom surface 103 of the cavity 104 of the female mold 101. The first film 20 includes a bottom surface 201 facing the bottom surface 103 and a top surface 202 opposite to the bottom surface 201. A first pattern 21, a second pattern 22, and a third pattern 23 are formed on the bottom surface 201. A color layer 24 is printed on the bottom surface 201 around the second pattern 22. A thickening layer 26 is attached to the first pattern 21 and faces towards the bottom surface 103. The thickening layer 26 is printed with transparent ink. A thickening layer 28 is attached to the color layer 24, facing the bottom surface 103. A fourth pattern 27 is printed on the top surface 202. In another embodiment, thickening layers can be attached to the second pattern 22 and the third pattern 23. These thickening layers 26 and 28 may be of different thicknesses.

Step S406, a second film 30 is provided to be attached to the male mold 102. A pattern 31 is printed on the second film 30 opposite to the male mold 102.

Figure 3:
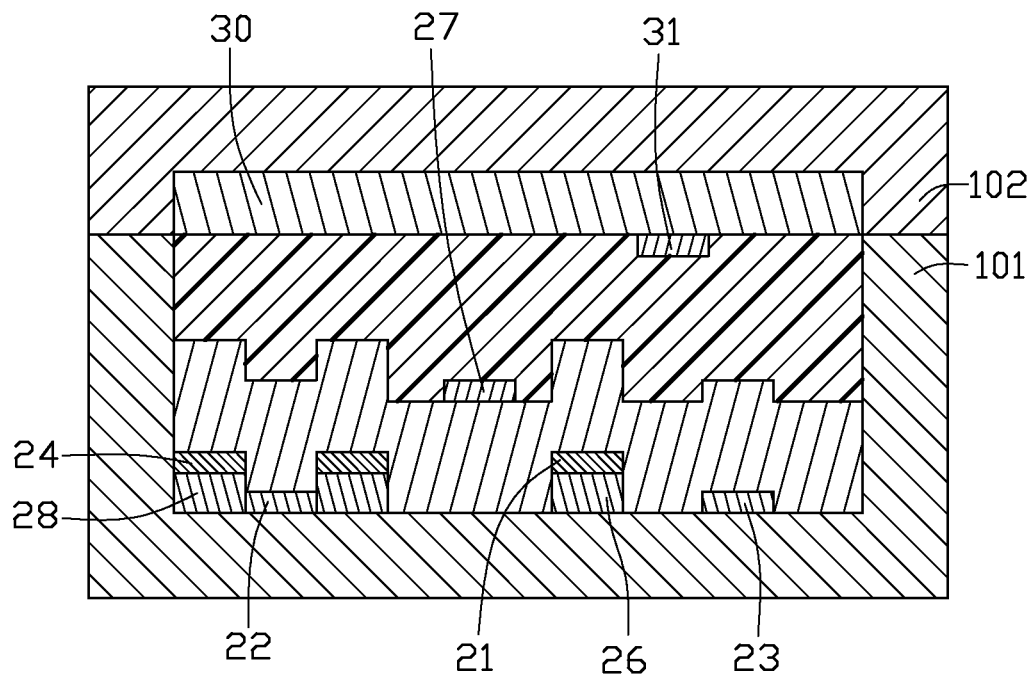
FIG. 3 is similar to FIG. 2, but showing a state of use after injecting resin.

Step S408, referring to FIG. 3, molten resin is injected into the cavity 104 of the mold 100, to press the first film 20 tightly against the bottom surface 103. The first pattern 21, the second pattern 22, the third pattern 23, the color layer 24, and the thickening layer 26 and 28 are all tightly pressed so as to leave no gaps or bubbles on the bottom surface 201 of the first film 20.

Figure 4:
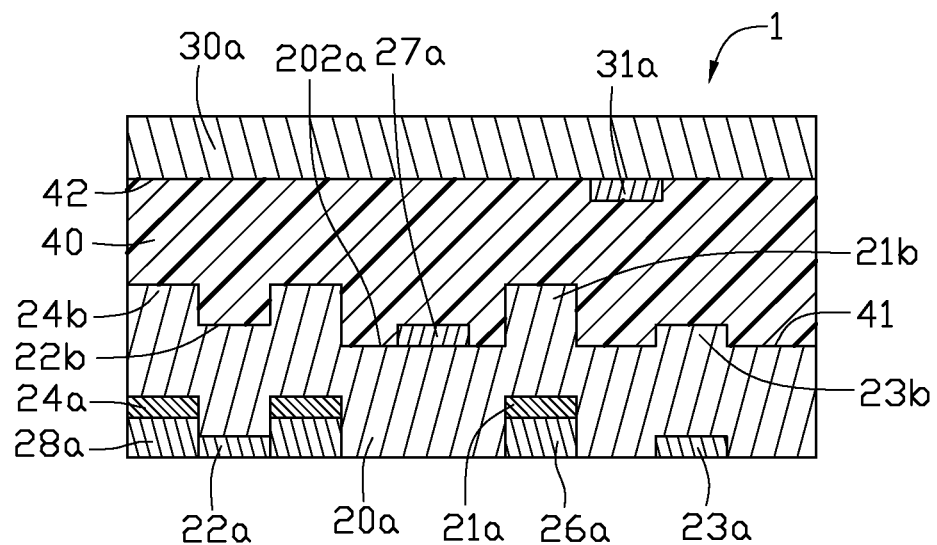
FIG. 4 is a cross-sectional view of a plastic product manufactured by the apparatus of FIG. 2.

Step S410, referring to FIG. 4, the molten resin in the mold 100 is cooled to form a plastic product 1, with the first film 20 and the second film 30 attached to opposite sides (first and second sides 41 and 42) of the plastic product 1.

The plastic product 1 includes a base 40 molded by injecting resin, a first attaching portion 20a attached to the first side 41 of the base 40, and a second attaching portion 30a attached to the second side 42 of the base 40. The first attaching portion 20a is formed by the first film 20 of the FIG. 1, formed in the mold 100 after injection. The plastic product 1 further includes a first pattern 21a, a second pattern 22a, a third pattern 23a, and a color layer 24a around the second pattern 22a, all inserted into the first attaching portion 20a. Two thickening portions 26a and 28a are respectively attached to the first pattern 21a and the color layer 24a. Based on the top surface 202a of the first attaching portion 20a, the first attaching portion 20a includes a first protrusion 21b according to the first pattern 21a, a second protrusion 22b according to the second pattern 22a, a third protrusion 23b according to the third pattern 23a, a fourth protrusion 24b according to the color layer 24a, and a fourth pattern 27a. The first to fourth protrusions 21b, 22b, 23b, 24b, the thickening portions 26a and 28a, and the fourth pattern 27a are all inserted into the first side 41 of the base 40.

The second attaching portion 30a is formed by the second film 30 of the FIG. 1 being formed in the mold 100 after injection. The second attaching portion 30a includes a fifth pattern 31a facing the base 40. The fifth pattern 31a is inserted into the second side 42 of the base 40.

The second attaching portion 30a and the base 40 are made of transparent or semitransparent material. Thus the first pattern 21a, the second pattern 22a, the third pattern 23a, the color layer 24a, the fourth pattern 27a, and the fifth pattern 31a are visible through the second attaching portion 30a and the base 40 as three dimensional patterns. The second pattern 22a is shown as a sunken decoration according to the color layer 24a. The first pattern 21a and the fourth pattern 27a are shown as protruding or relief decorations.

Figure 5:
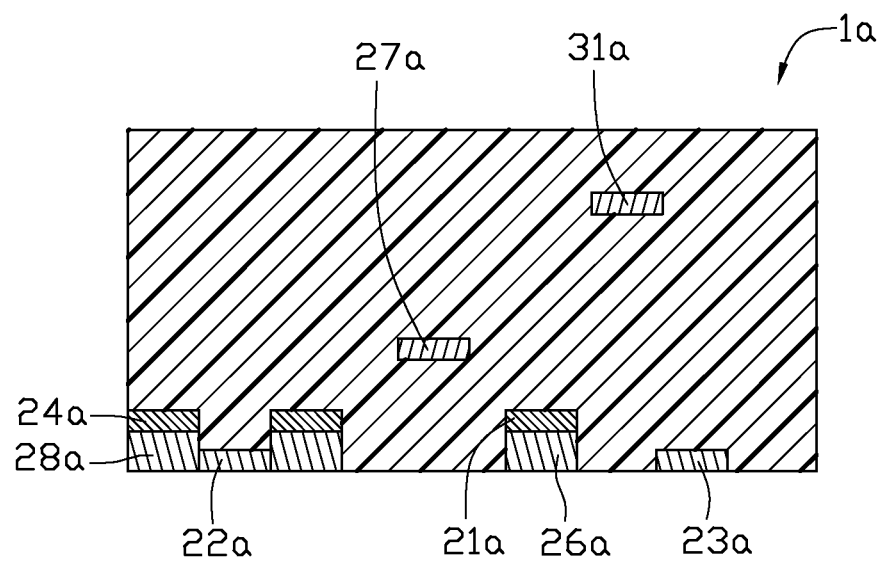
FIG. 5 is a cross-sectional view of a plastic product of a second exemplary embodiment.

Referring to FIG. 5, in a second embodiment of the present disclosure, the base 40, the first attaching portion 20a, and the second attaching portion 30a of a plastic product 1a are made of the same material(s), thus the interfaces between the base 40, the first attaching portion 20a, and the second attaching portion 30a are not shown.

Figure 6:
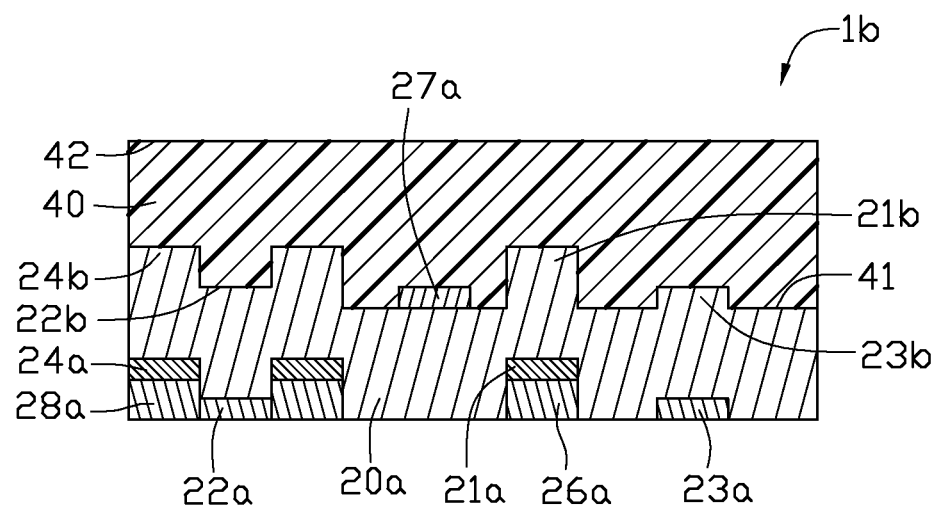
FIG. 6 is a cross-sectional view of a plastic product of a third exemplary embodiment.

Referring to FIG. 6, in a third embodiment of the present disclosure, a plastic product 1b includes the base 40 and the first attaching portion 20a.

Figure 7:
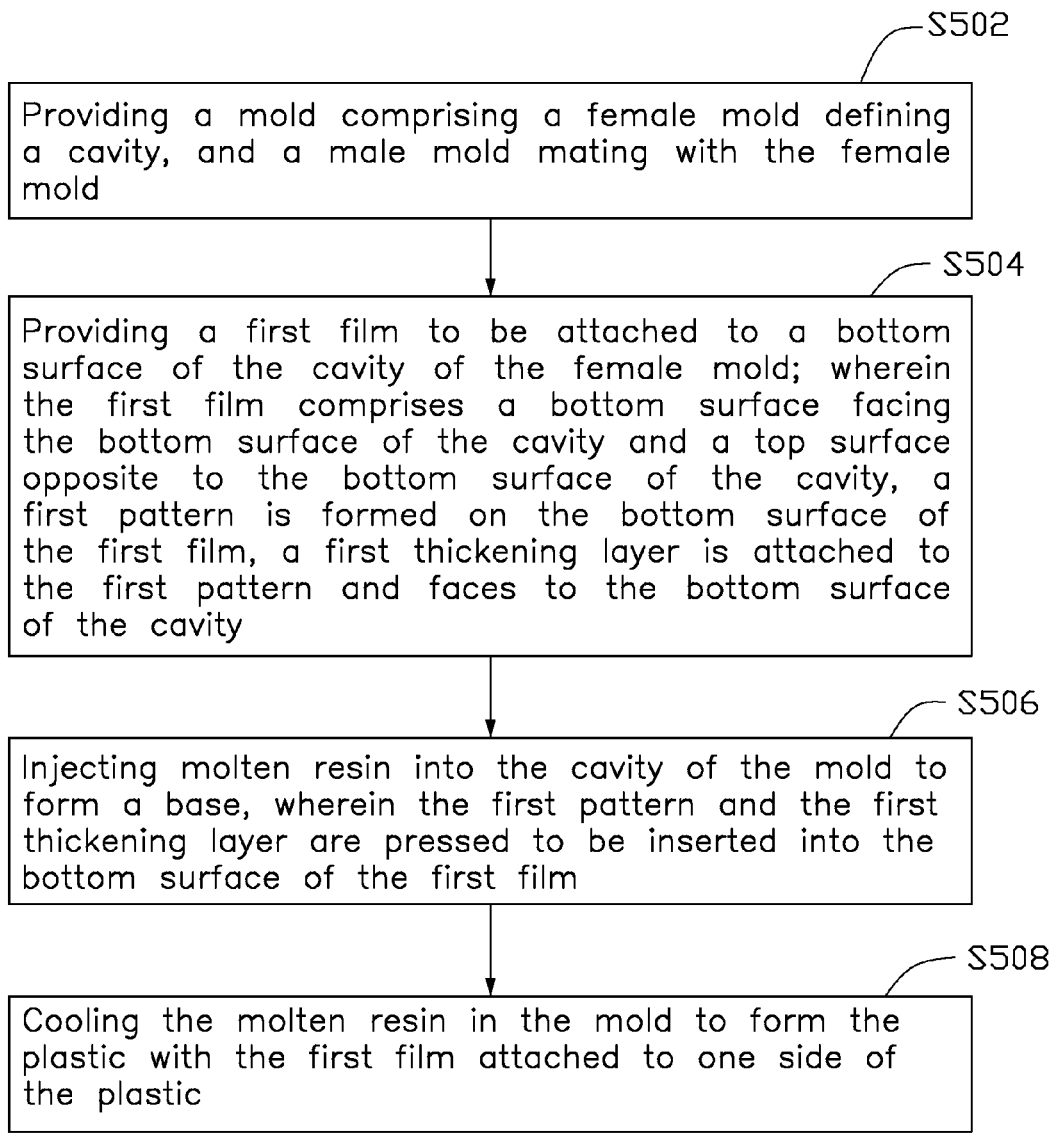
FIG. 7 is a flow chart of a method for manufacturing plastic products having three dimensional patterns in accordance with a second exemplary embodiment of the present application.
Figure 8:
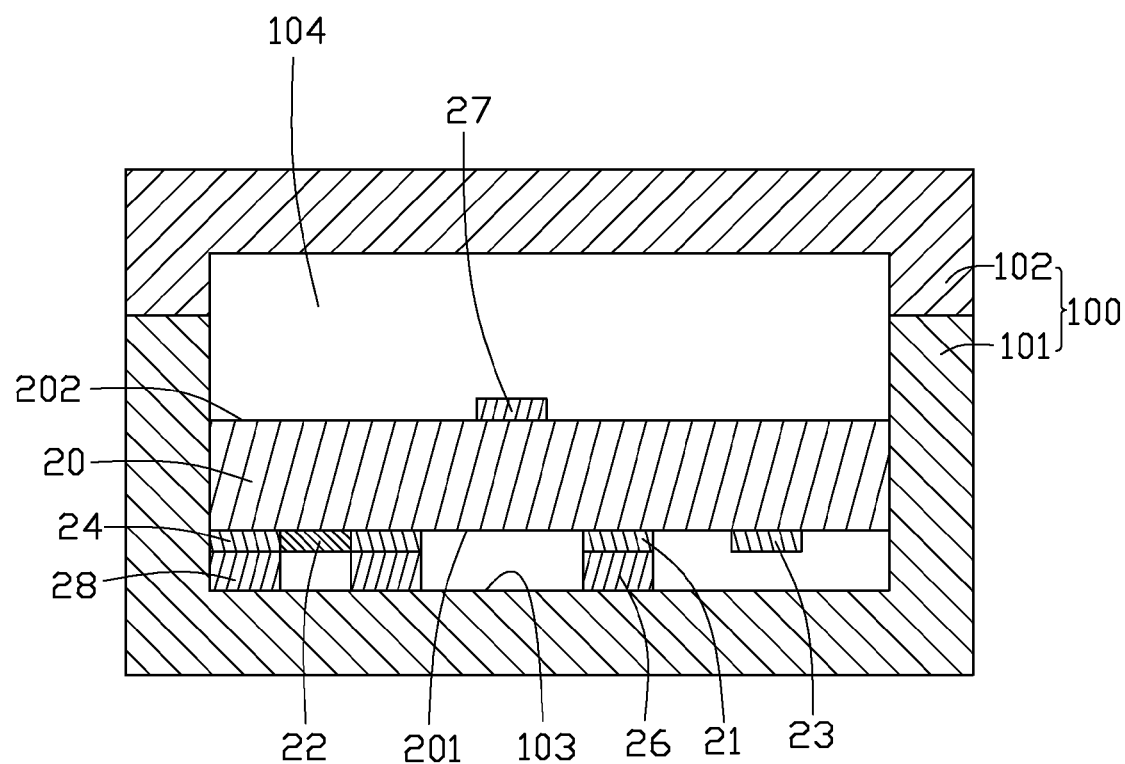
FIG. 8 is a cross-sectional view of an apparatus manufactured by the method of FIG. 7, before injecting resin.

Referring to FIG. 7 and FIG. 8, a method for manufacturing the plastic product 1b includes the following steps.

Step S502, a mold 100 is provided to mold the plastic product, the mold 100 includes a female mold 101 and a male mold 102 mating with the female mold 101.

Step S504, a first film 20 is provided to be attached to a bottom surface 103 of the cavity 104 of the female mold 101. The first film 20 includes a bottom surface 201 facing the bottom surface 103 and a top surface 202 opposite to the bottom surface 201. A first pattern 21, a second pattern 22, and a third pattern 23 are formed on the bottom surface 201. A color layer 24 is printed on the bottom surface 201 around the second pattern 22. A thickening layer 26 is attached to the first pattern 21, facing towards the bottom surface 103. The thickening layer 26 is printed with transparent ink. A thickening layer 28 is attached to the color layer 24, facing the bottom surface 103. A fourth pattern 27 is printed on the top surface 202.

Step S506, molten resin is injected into the molding 100, to press the first film 20 tightly against the bottom surface 103. The first pattern 21, the second pattern 22, the third pattern 23, the color layer 24, and the thickening layers 26 and 28 are all compressed tightly so as to leave no gaps or bubbles on the bottom surface 201 of the first film 20.

Step S508, the molten resin in the mold 100 is cooled to form the plastic product 1b, with the first film 20 being attached to one side of the plastic product 1b.

Even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A method for manufacturing a plastic product having three dimensional patterns, comprising:
   providing a mold comprising a female mold defining a cavity, and a male mold mating with the female mold;
   providing a first film to be attached to a bottom surface of the cavity of the female mold; wherein the first film comprises a bottom surface facing the bottom surface of the cavity and a top surface opposite to the bottom surface of the cavity, a first pattern is formed on the bottom surface of the first film, a first thickening layer is attached to the first pattern and faces to the bottom surface of the cavity, a second pattern and a color layer around the second pattern are both attached to the bottom surface of the first film, and a second thickening layer with a thickness different from the first thickening layer is attached to the color layer away from the first film;
   injecting molten resin into the cavity of the mold to form a base, wherein the first pattern, the first thickening layer, the second pattern, the color layer, and the second thickening layer are pressed to be inserted into the bottom surface of the first film; and
   cooling the molten resin in the mold to form the plastic product with the first film attached to one side of the plastic product.

2. The method of claim 1, wherein the first film comprises a third pattern formed on the bottom surface of the first film.

3. The method of claim 1, wherein the first film comprises a fourth pattern printed on the top surface of the first film.

4. A method for manufacturing a plastic product having three dimensional patterns, comprising:
   providing a mold comprising a female mold defining cavity, and a male mold mating with the female mold;
   providing a first film to be attached to a bottom surface of the cavity of the female mold; wherein the first film comprises a bottom surface facing the bottom surface of the cavity and a top surface opposite to the bottom surface of the cavity, a first pattern is formed on the bottom surface, a first thickening layer is attached to the first pattern and faces to the bottom surface of the cavity, a second pattern and a color layer around the second pattern are both attached to the bottom surface of the first film, and a second thickening layer with a thickness different from the first thickening layer is attached to the color layer away from the first film;
   providing a second film attached to the male mold;
   injecting molten resin into the cavity of the mold to form a base, wherein the first pattern, the first thickening layer, the second pattern, the color layer, and the second thickening layer are pressed to be inserted into the bottom surface of the first film; and
   cooling the molten resin in the mold to form the plastic product with the first film attached to one side of the plastic product.

5. The method of claim 4, wherein the first film comprises a third pattern formed on the bottom surface of the first film.

6. The method of claim 4, wherein the first film comprises a fourth pattern printed on the top surface of the first film.

7. The method of claim 4, wherein a pattern is printed on the second film away from the male mold.

* * * * *